US010400316B2

(12) United States Patent
Nakajima et al.

(10) Patent No.: US 10,400,316 B2
(45) Date of Patent: Sep. 3, 2019

(54) HIGH STRENGTH HOT ROLLED STEEL SHEET HAVING TENSILE STRENGTH OF 780 MPA OR MORE

(71) Applicant: JFE STEEL CORPORATION, Tokyo (JP)

(72) Inventors: Katsumi Nakajima, Kawasaki (JP); Yoshimasa Funakawa, Fukuyama (JP); Nobuyuki Nakamura, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 314 days.

(21) Appl. No.: 14/778,339

(22) PCT Filed: Mar. 11, 2014

(86) PCT No.: PCT/JP2014/001379
§ 371 (c)(1),
(2) Date: Sep. 18, 2015

(87) PCT Pub. No.: WO2014/148001
PCT Pub. Date: Sep. 25, 2014

(65) Prior Publication Data

US 2016/0138141 A1 May 19, 2016

(30) Foreign Application Priority Data

Mar. 19, 2013 (JP) ................................ 2013-056487

(51) Int. Cl.

| | |
|---|---|
| ***C21D 1/20*** | (2006.01) |
| ***C21D 6/00*** | (2006.01) |
| ***C22C 38/50*** | (2006.01) |
| ***C22C 38/00*** | (2006.01) |
| ***C22C 38/14*** | (2006.01) |
| ***H01F 1/16*** | (2006.01) |
| ***C21D 8/12*** | (2006.01) |
| ***C22C 38/02*** | (2006.01) |
| ***C22C 38/04*** | (2006.01) |
| ***C22C 38/06*** | (2006.01) |

(Continued)

(52) U.S. Cl.
CPC ............ *C22C 38/50* (2013.01); *B32B 15/013* (2013.01); *C21D 8/1222* (2013.01); *C21D 8/1261* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/42* (2013.01); *C22C 38/58* (2013.01); *C23C 2/06* (2013.01); *C23C 2/40* (2013.01); *H01F 1/16* (2013.01); *C21D 9/46* (2013.01); *C21D 2211/002* (2013.01); *C21D 2211/004* (2013.01)

(58) Field of Classification Search
CPC ...... B21D 22/022; B32B 15/013; C21D 1/20; C21D 1/84; C21D 2211/002; C21D 2211/003; C21D 6/004; C21D 6/005; C21D 6/008; C21D 6/0205; C21D 6/0226; C21D 6/0263; C21D 6/0426; C21D 6/0463; C21D 9/46; C22C 18/04; C22C 38/00; C22C 38/001; C22C 38/002; C22C 38/005; C22C 38/008; C22C 38/02; C22C 38/04; C22C 38/06; C22C 38/08; C22C 38/12; C22C 38/14; C22C 38/16; C22C 38/24; C22C 38/28; C22C 38/32; C22C 38/38; C22C 38/42; C22C 38/44; C22C 38/46; C22C 38/48; C22C 38/50; C22C 38/54; C22C 38/58
See application file for complete search history.

(56) References Cited

U.S. PATENT DOCUMENTS 4,219,371 A 8/1980 Nakasugi et al.
6,818,079 B2 * 11/2004 Inoue .................. C21D 8/0226 148/541

(Continued)

FOREIGN PATENT DOCUMENTS

EP 1865083 A1 12/2007
EP 2184373 A1 5/2010

(Continued)

OTHER PUBLICATIONS

Jan. 11, 2017 Office Action issued in Chinese Patent Application No. 201480017116.4.

(Continued)

*Primary Examiner* — Colleen P Dunn
*Assistant Examiner* — Anthony M Liang
(74) *Attorney, Agent, or Firm* — Oliff PLC

(57) ABSTRACT

A high strength hot rolled steel sheet with good formability, which has good magnetic properties, excellent punchability, and a tensile strength of 780 MPa or more. The high strength hot rolled steel sheet having a chemical composition containing C: 0.070% to 0.140%, Si: 0.10% to 1.00%, Mn: 1.00% to 1.80%, P: 0.050% or less, S: 0.0050% or less, N: 0.0080% or less, Al: 0.010% to 0.100%, Ti: 0.050% to 0.150%, and the remainder composed of Fe and incidental impurities, on a percent by mass basis, and 95% or more of bainite microstructure on a volume fraction basis, wherein carbides constituting 80% or more of total precipitation carbides are dispersed at grain boundaries of bainitic ferrite constituting the bainite microstructure and 80% or more of total precipitation carbides have particle grain sizes of 20 to 300 nm.

7 Claims, No Drawings

(51) Int. Cl.

| | |
|---|---|
| ***C22C 38/08*** | (2006.01) |
| ***C22C 38/12*** | (2006.01) |
| ***C22C 38/16*** | (2006.01) |
| ***C22C 38/28*** | (2006.01) |
| ***C22C 38/42*** | (2006.01) |
| ***B32B 15/01*** | (2006.01) |
| ***C22C 38/58*** | (2006.01) |
| ***C23C 2/06*** | (2006.01) |
| ***C23C 2/40*** | (2006.01) |
| *C21D 9/46* | (2006.01) |

(56) References Cited

U.S. PATENT DOCUMENTS

| | | | | |
|---|---|---|---|---|
| 9,222,155 | B2 | 12/2015 | Nakamura et al. | |
| 2002/0007882 | A1* | 1/2002 | Inoue ................... | C21D 8/0226 148/541 |
| 2003/0205302 | A1* | 11/2003 | Inoue ................... | C21D 8/0226 148/541 |
| 2005/0000606 | A1* | 1/2005 | Inoue ................... | C21D 8/0226 148/602 |
| 2008/0223491 | A1 | 9/2008 | Kimijima | |
| 2010/0003535 | A1 | 1/2010 | Hara et al. | |
| 2013/0061989 | A1 | 3/2013 | Nakamura et al. | |
| 2013/0160904 | A1 | 6/2013 | Saito et al. | |
| 2013/0276940 | A1* | 10/2013 | Nakajima ............ | C21D 8/0226 148/602 |
| 2014/0007993 | A1* | 1/2014 | Nakajima ................ | C21D 6/00 148/602 |
| 2016/0060723 | A1 | 3/2016 | Yamazaki et al. | |
| 2016/0076124 | A1 | 3/2016 | Yamazaki et al. | |
| 2016/0258032 | A1 | 9/2016 | Nakajima et al. | |

FOREIGN PATENT DOCUMENTS

| | | | |
|---|---|---|---|
| EP | 2559783 | A1 | 2/2013 |
| JP | S63-166931 | A | 7/1988 |
| JP | 2000-109951 | A | 4/2000 |
| JP | 2003-268509 | A | 9/2003 |
| JP | 2005298956 | A * | 10/2005 |
| JP | 4273768 | B2 | 6/2009 |
| JP | 2009-280900 | A | 12/2009 |
| WO | 2009/133965 | A1 | 11/2009 |
| WO | 2011/152541 | A1 | 12/2011 |
| WO | 2012/036307 | A1 | 3/2012 |
| WO | 2013/115205 | A1 | 8/2013 |

OTHER PUBLICATIONS

Mar. 10, 2017 Office Action issued in Korean Patent Application No. 10-2015-7023008.

May 3, 2016 Office Action issued in Chinese Application No. 201480017116.4.

May 27, 2014 Search Report issued in International Patent Application No. PCT/JP2014/001379.

May 23, 2016 Extended Search Report issued in European Application No. 14768388.2.

Dec. 15, 2016 Office Action issued in U.S. Appl. No. 13/820,660.

Jun. 1, 2017 Office Action issued in U.S. Appl. No. 14/370,330.

Sep. 30, 2017 Office Action issued in Chinese Patent Application No. 201480017116.4.

Oct. 13, 2017 Office Action issued in U.S. Appl. No. 15/143,965.

Oct. 17, 2017 Office Action issued in U.S. Appl. No. 14/784,450.

Feb. 22, 2018 Office Action issued in U.S. Appl. No. 13/820,660.

Feb. 23, 2018 Office Action issued in U.S. Appl. No. 15/143,965.

Apr. 24, 2018 Office Action issued in U.S. Appl. No. 14/784,450.

Nov. 30, 2018 Office Action issued in Chinese Patent Application No. 201480017116.4.

Tang, Di., et al., "5000 Questions on New Technologies for Energy Saving and Emission Reduction in the Steel Industry," vol. II, Rolling System Volume, China Science and Technology Press, Jul. 2009, pp. 204.

Oct. 11, 2017 Office Action issued in U.S. Appl. No. 14/370,330.

* cited by examiner

HIGH STRENGTH HOT ROLLED STEEL SHEET HAVING TENSILE STRENGTH OF 780 MPA OR MORE

TECHNICAL FIELD

This application is directed to a high strength hot rolled steel sheet with good formability, which is used as, for example, a rim material for rotary machine of a rotor of a hydraulic generator and which has a tensile strength of 780 MPa or more and excellent magnetic properties.

BACKGROUND

In recent years, steel sheets used as structural members for electric equipment have been required to have magnetic properties, i.e. high magnetic permeability and magnetic flux density, in addition to mechanical properties for the purpose of enhancing performance of the electric equipment. In particular, rim materials for generators, such as, steel sheets for rotary machine rims of, for example, rotors of large generators for hydraulic power generation and the like are required to have high strength and high magnetic flux densities because large centrifugal forces are applied. Furthermore, in many cases, rim materials for generators are used after being provided with a very large number of punched holes, so that high punchability is required frequently.

Among the above-described magnetic properties, the magnetic permeability increases as the amount of coarse carbides in the steel is reduced and the magnetic flux density increases as the amount of nonmagnetic elements in the steel is reduced. Ultra low carbon steels have been previously used for steel sheets having excellent magnetic properties. However, they cannot achieve high strength although there are growing needs.

Patent Literature 1 discloses a method for manufacturing a high strength hot rolled steel sheet having a high magnetic flux density, wherein Ti and B are added to a Si—Mn steel. In this technology, B is added to improve the hardenability. However, B segregates at grain boundaries, suppresses ferrite transformation and, in addition, induces bainite transformation at lower temperatures, so that a lower bainite microstructure, in which carbides are dispersed in a bainite-lath, is formed easily. Carbides serve as starting points of fine cracks in punching. Therefore, if carbides are dispersed in the bainite-lath, a crack generated at a carbide in the bainite-lath proceeds through the bainite-lath to the boundary of the bainite-lath. Furthermore, this crack proceeds cross the bainite-lath boundary so as to become a macro crack easily. Consequently, cracks are generated easily in a punched surface. Therefore, the punchability, which is the aim of disclosed embodiments, is not achieved.

Patent Literature 2 discloses a hot rolled steel sheet which has a tensile strength of 590 MPa or more and in which less than 10 nm carbides are dispersed in 95% or more of ferrite microstructure on a volume fraction basis and a method for manufacturing the same. In the case of the ferrite microstructure, the material exhibits high local ductility and poor punchability.

CITATION LIST

Patent Literature

PTL 1: Japanese Unexamined Patent Application Publication No. 63-166931

PTL 2: Japanese Patent No. 4273768

SUMMARY

Technical Problem

As described above, neither the technology of Patent Literature 1 nor the technology of Patent Literature 2 in the related art achieves a high strength hot rolled steel sheet suitable for a rim material for generator, where the compatibility between the magnetic properties and the punchability is sufficiently ensured.

Disclosed embodiments have been made in consideration of the above-described circumstances and it is an object to provide a high strength hot rolled steel sheet with good formability, which has good magnetic properties, excellent punchability, and a tensile strength of 780 MPa or more.

Solution to Problem

Intensive research was conducted over and over again. As a result, it was found that the strength was able to be enhanced by applying a bainite microstructure as a base, the magnetic properties were able to be improved by making the grain sizes of carbides finer and, in addition, the punchability was able to be improved by dispersing appropriate sizes of carbides at grain boundaries. Disclosed embodiments have been made on the basis of the above-described findings and the gist thereof is as described below.

[1] A high strength hot rolled steel sheet with good formability, which has a tensile strength of 780 MPa or more and excellent magnetic properties, having a chemical composition containing C: 0.070% to 0.140%, Si: 0.10% to 1.00%, Mn: 1.00% to 1.80%, P: 0.050% or less, S: 0.0050% or less, N: 0.0080% or less, Al: 0.010% to 0.100%, Ti: 0.050% to 0.150%, and the remainder composed of Fe and incidental impurities, on a percent by mass basis, and 95% or more of bainite microstructure on a volume fraction basis, wherein carbides constituting 80% or more of total precipitation carbides are dispersed at grain boundaries of bainitic ferrite constituting the above-described bainite microstructure and 80% or more of total precipitation carbides concerned have particle grain sizes of 20 to 300 nm.

[2] The high strength hot rolled steel sheet with good formability, which has a tensile strength of 780 MPa or more and excellent magnetic properties, according to the item [1], wherein the average grain size of the above-described bainitic ferrite is 1.5 to 5.0 μm.

[3] The high strength hot rolled steel sheet with good formability, which has a tensile strength of 780 MPa or more and excellent magnetic properties, according to the item [1] or item [2], further containing at least one selected from V: 0.005% to 0.100% and Nb: 0.005% to 0.100% on a percent by mass basis.

[4] The high strength hot rolled steel sheet with good formability, which has a tensile strength of 780 MPa or more and excellent magnetic properties, according to any one of the items [1] to [3], further containing at least one of Cu: 0.005% to 0.100%, Ni: 0.005% to 0.100%, Cr: 0.002% to 0.100%, and Mo: 0.002% to 0.100% on a percent by mass basis.

[5] The high strength hot rolled steel sheet with good formability, which has a tensile strength of 780 MPa or more and excellent magnetic properties, according to any one of the items [1] to [4], further containing at least one of Ca: 0.0005% to 0.0050% and REM: 0.0005% to 0.0300% on a percent by mass basis.

Advantageous Effects

According to embodiments a high strength hot rolled steel sheet with good formability, which has excellent magnetic properties, excellent punchability, and a tensile strength of 780 MPa or more can be obtained. The high strength hot rolled steel sheet with good formability, according to embodiments, is suitable for rim materials for large generators and the like.

DETAILED DESCRIPTION

Disclosed embodiments will be specifically described below. In this regard, the term "%" related to the chemical composition refers to "percent by mass" unless otherwise specified.

1) Chemical Composition

C: 0.070% to 0.140%

C is an element effective in not only ensuring the necessary strength but also forming the bainite microstructure. In order to obtain the tensile strength (hereafter may be referred to as TS) of 780 MPa or more and a predetermined microstructure, it is necessary that the amount of C be 0.070% or more. On the other hand, if the amount of C is more than 0.140%, carbides become coarse and the punchability is degraded. Therefore, the amount of C is specified to be 0.070% to 0.140%, and preferably 0.080% to 0.120%.

Si: 0.10% to 1.00%

Addition of 0.10% or more of Si is effective in improving the punchability because carbides are made finer. On the other hand, if the amount of Si is more than 1.00%, not only significant degradation in the surface quality is caused but also it is difficult to obtain a predetermined microstructure. Therefore, the amount of Si is specified to be 0.10% to 1.00%, and preferably 0.60% to 0.85%.

Mn: 1.00% to 1.80%

Mn is an element effective in ensuring the strength on the basis of solute strengthening and forming the bainite microstructure. In order to obtain TS of 780 MPa or more and a predetermined microstructure, it is necessary that the amount of Mn be 1.00% or more. On the other hand, if the amount of Mn is more than 1.80%, the punchability is degraded significantly because the strength is enhanced excessively. Also, the magnetic properties are degraded because the transformation temperature becomes too low and, thereby, lower bainite is generated. Therefore, the amount of Mn is specified to be 1.00% to 1.80%, and preferably 1.20% to 1.70%.

P: 0.050% or Less

If the amount of P is more than 0.050%, degradation in the punchability is caused by segregation. Therefore, the amount of P is specified to be 0.050% or less, and preferably 0.030% or less.

S: 0.0050% or Less

S forms a sulfide and, thereby, degrades the punchability. Therefore, S is specified to be 0.0050% or less, and preferably 0.0030% or less.

N: 0.0080% or Less

A large amount of N, where the content is more than 0.080%, is harmful because a large amount of nitride is generated in a production process and, thereby, the hot ductility is degraded. Also, coarse nitrides, e.g., TiN, are generated, so that cracking occurs easily in a punched surface and the punchability is degraded. Therefore, the amount of N is specified to be 0.0080% or less, and preferably 0.0050% or less.

Al: 0.010% to 0.100%

Al is an important element as a deoxidizing agent of steel and it is necessary that the amount of Al be 0.010% or more. On the other hand, if the amount of Al is more than 0.100%, casting becomes difficult and a large amount of inclusion remains in the steel, so that degradation of the material and the surface quality is caused. Therefore, the amount of Al is specified to be 0.10% to 0.100%, and preferably 0.020% to 0.075%.

Ti: 0.050% to 0.150%

Ti is an element effective in enhancing the strength, making crystal grains finer, and forming a bainite microstructure. In order to form 95% or more of bainite microstructure on a volume fraction basis, it is necessary that the amount of Ti be 0.050% or more. If the amount of Ti is more than 0.150%, coarse nitrides and carbides are formed, so that the punchability, toughness, and the like are adversely affected. Therefore, the amount of Ti is specified to be 0.050% to 0.150%, and preferably 0.060% to 0.140%.

In addition, as necessary, at least one selected from V: 0.005% to 0.100% and Nb: 0.005% to 0.100% can be contained.

Each of V and Nb contributes to retardation of recrystallization and, therefore, may be contained for the purpose of making crystal grains finer. Such an effect is obtained by specifying the content of each of them to be 0.005% or more. The content is specified to be 0.100% or less because even if the content is more than 0.100%, an effect corresponding to the cost is not obtained. Each content is preferably 0.030% or less. In this regard, each of V and Nb is used subsidiarily because the alloy costs of them are higher than that of Ti.

In addition, as necessary, at least one of Cu: 0.005% to 0.100%, Ni: 0.005% to 0.100%, Cr: 0.002% to 0.100%, and Mo: 0.002% to 0.100% can be contained.

Each of Cu and Ni contributes to enhancement of the strength in the case where the content is 0.005% or more. The content is specified to be 0.100% or less because if the content is more than 0.100%, surface cracking may occur during hot rolling. Each of Cr and Mo is a carbide-forming element and contributes to enhancement of the strength in the case where the content is specified to be 0.002% or more. If the content is more than 0.100%, an effect corresponding to the cost is not obtained. Therefore, the content is specified to be 0.100% or less. Each content is preferably 0.050% or less.

At least one of Ca: 0.0005% to 0.0050% and REM: 0.0005% to 0.0300% can be contained.

Ca and REM (rare earth metals) are elements effective in morphological control of inclusions and contribute to improvement of the punchability. In order to obtain such effects, the amount of Ca and the amount of REM are specified to be preferably 0.0005% or more. On the other hand, if the amount of Ca is more than 0.0050% or the amount of REM is more than 0.0300%, inclusions in the steel increase and the material is degraded. Therefore, preferably, the amount of Ca is specified to be 0.0005% to 0.0050% and the amount of REM is specified to be 0.0005% to 0.0300%. More preferably, the amount of Ca is specified to be 0.0010% to 0.0030% and the amount of REM is specified to be 0.0010% to 0.0050%.

The remainder other than those described above is composed of Fe and incidental impurities.

2) Microstructure

In embodiments, it is preferable that 95% or more of bainite microstructure on a volume fraction basis is included, carbides constituting 80% or more of total precipitation carbides are dispersed at grain boundaries of bainitic ferrite constituting the bainite microstructure, and 80% or more of total precipitation carbides have particle grain sizes of 20 to 300 nm. The bainite microstructure is effective from the viewpoint of ensuring of a tensile strength of 780 MPa or more. Meanwhile, from the viewpoint of the magnetic properties, a single phase microstructure is most desirable and a secondary phase is desirably minimized because movement of the magnetic flux is hindered at phase boundaries in a multiphase microstructure. However, even the single phase, the bainite, e.g., lower bainite, which transforms at low temperatures has a very high dislocation density and, therefore, the magnetic properties are degraded. On the other hand, if ferrite transformation occurs at high temperatures, coarse carbides, e.g., pearlite, are generated, and they also degrade the magnetic properties.

In embodiments, substantially bainite single phase microstructure is established by inducing bainite transformation at relatively high temperatures (although at temperatures lower than the temperature at which the ferrite transformation occurs). The transformation is induced at relatively high temperatures and, therefore, the dislocation density in the bainite is not so high and the magnetic properties are not degraded. In addition, the bainite transformation is induced at relatively high temperatures, so that carbides are precipitated mainly at bainitic ferrite grain boundaries in contrast to the lower bainite. The punchability can be ensured without degradation of the magnetic properties by dispersing carbides constituting 80% or more of total precipitation carbides at grain boundaries of bainitic ferrite and specifying 80% or more of total precipitation carbides to be carbides having particle grain sizes of 20 to 300 nm. In this regard, the bainite microstructure here refers to upper bainite. The upper bainite is a microstructure in which carbides and/or Martensite-Austenite Constituent (MA) is present at grain boundaries of bainitic ferrite constituting the bainite. The entirety of the bainitic ferrite and the cementite and/or Martensite-Austenite Constituent (MA) is considered to be one microstructure and is referred to as the upper bainite. Meanwhile, the lower bainite is a microstructure in which cementite is precipitated in the bainitic ferrite and the position of precipitation of the cementite is different from that of the upper bainite. The upper bainite and the lower bainite are generically called bainite. Also, the case where 5 percent by volume or less in total of polygonal ferrite phase, pearlite, and the like are contained as the secondary phase is within the scope of disclosed embodiments.

Volume Fraction of Bainite Microstructure: 95% or More

In embodiments, in the case where the volume fraction of the bainite microstructure is less than 95%, not only the magnetic properties but also the punchability, the toughness, and the like are degraded. The volume fraction of bainite microstructure is desirably 97% or more.

Carbides dispersed at grain boundaries of bainitic ferrite: 80% or more of total precipitation carbides In the case where carbides, which are dispersed at grain boundaries of bainitic ferrite constituting the bainite microstructure, are less than 80% of total precipitation carbides, carbides present in grains of the bainitic ferrite increase and the punched surface quality is degraded. Then, 85% or more is desirable.

Proportion of carbides having particle grain sizes of 20 to 300 nm in total precipitation carbides: 80% or more If the proportion of carbides having particle grain sizes of more than 300 nm is large, the magnetic properties are adversely affected. Meanwhile, if the proportion of carbides having grain sizes of less than 20 nm is large, the punchability is degraded. Therefore, in the case where the proportion of carbides having particle grain sizes of 20 to 300 nm is less than 80% of total precipitation carbides, the magnetic properties or the punchability is degraded. Consequently, the proportion of carbides having particle grain sizes of 20 to 300 nm in the total precipitation carbides is specified to be 80% or more.

Average grain size of bainitic ferrite: 1.5 to 5.0 μm In addition, the average grain size of bainitic ferrite constituting the bainite microstructure is specified to be preferably 1.5 to 5.0 μm. In embodiments, grain boundaries of the bainitic ferrite are important as precipitation sites of carbides. If the grain size of the bainitic ferrite becomes too large, the area of grain boundaries is reduced and precipitation of carbides at the grain boundaries becomes difficult. As a result, carbides precipitate in grains easily, carbides dispersed at grain boundaries become less than 80% of total precipitation carbides. Consequently, the average grain size of the bainitic ferrite is preferably 5.0 μm or less, and more preferably 4.0 μm or less. On the other hand, grain boundaries of the bainitic ferrite hinder movement of the magnetic flux and degrade the magnetic properties. Therefore, the average grain size of the bainitic ferrite is preferably 1.5 μm or more, and more preferably 1.7 μm or more.

3) Manufacturing Method

Next, a method for manufacturing the high strength hot rolled steel sheet with good formability, according to embodiments, will be described. The high strength hot rolled steel sheet with good formability is produced by using a steel slab having the above-described chemical composition. Preferable conditions of the manufacturing method will be described below.

Reheating temperature of steel slab: 1,150° C. to 1,300° C. In the embodiments, it is important that a steel slab having the above-described chemical composition is reheated to 1,150° C. or higher to allow carbides at the slab stage to form a solid solution again. In the case of reheating at lower than 1,150° C., Ti carbides in the slab do not form a solid solution again, and the toughness and the magnetic properties are adversely affected. In the case of more than 1,300° C., a surface layer microstructure is coarsened, the punchability is degraded and, in addition, Si base scale is generated to impair the surface quality. Therefore, 1,300° C. or lower is applied.

Hot rolling condition: finishing temperature of $Ar_3$ transformation point to ($Ar_3$ transformation point+80)° C. and rolling reduction of final stand of 20% or more The finishing temperature of the hot rolling is preferably within the range of $Ar_3$ transformation point to ($Ar_3$ transformation point+80)° C. In the case of lower than $Ar_3$ transformation point, ferrite is generated and, thereby, a predetermined bainite microstructure is not obtained. In the case of a temperature higher than ($Ar_3$ transformation point+80)° C., crystal grains are coarsened and the punchability is degraded. In this regard, $Ar_3$ transformation point here refers to a transformation temperature determined on the basis of the change point of a thermal expansion curve determined by a thermomechanical simulation test at a cooling rate of 10° C./s. Meanwhile, in embodiments, in the case where the rolling reduction of the finish rolling final, stand is less than 20%, the austenite grain size just after completion of the rolling is large. As a result, the grain size of bainitic ferrite constituting the bainite transformed from the austenite becomes large. Consequently, a microstructure in which carbides dispersed at grain boundaries of bainitic ferrite are 80% or more of total precipitation carbides is not obtained and the punchability is not improved. Therefore, the rolling reduction of the finish rolling final stand is preferably 20% or more, and more preferably 25% or more.

Average cooling rate after hot rolling: 30° C./s or more

Forced cooling is started just after or preferably within 1.5 s of completion of the hot rolling, the cooling is stopped at a coiling temperature, and coiling into the shape of a coil is performed. If the average cooling rate from the finish rolling temperature to the coiling temperature is less than 30° C./s, a ferrite phase is generated and it becomes difficult to specify a bainite phase in the hot rolled steel sheet to be 95% or more. Therefore, the average cooling rate after the hot rolling is specified to be preferably 30° C./s or more, and further preferably 40° C./s or more. The upper limit of the average cooling rate is not particularly specified. On the other hand, if the average cooling rate is too large, the bainite transformation occurs at lower temperatures and lower bainite is generated easily. Consequently, it becomes difficult to ensure a predetermined microstructure. Therefore, the average cooling rate is specified to be preferably 150° C./s or less. In this regard, the above-described average cooling rate refers to the average cooling rate on the surface of the steel sheet.

Coiling temperature: 380° C. to 480° C.

In the case where the coiling temperature is higher than 480° C., pearlite is generated and 95% or more of bainite microstructure cannot be ensured. In the case of lower than 380° C., a microstructure, e.g., lower bainite or martensite, having a high dislocation density is generated, and the magnetic properties cannot be satisfied.

Other production conditions can follow common conditions. For example, a steel having a predetermined composition is melted in a converter, an electric furnace, an induction furnace, or the like. Subsequently, production is performed through secondary smelting in a vacuum degassing furnace. Preferably, casting thereafter is performed by a continuous casting method from the viewpoint of the productivity and the quality. Also, a method by blooming rolling can be applied. The slab to be cast may be a common slab having a thickness of about 200 to 300 mm or be a thin slab having a thickness of about 30 mm. If the thin slab is employed, rough rolling can be omitted. The slab after casting may be subjected as-is to direct hot rolling or be subjected to hot rolling after being reheated in a furnace.

Also, the high strength hot rolled steel sheet with good formability, according to embodiments, may be coated steel sheets, e.g., electrolytic zinc-coated steel sheets, hot-dip zinc-coated steel sheets, and alloyed hot dip galvanized steel sheets. The condition of coating is not specifically limited and a common method may be employed.

EXAMPLES

Example 1

Steel slab Nos. A to I having compositions and the $Ar_3$ transformation points shown in Table 1 were heated to 1,250° C., and hot rolled steel sheets Nos. 1 to 13 were produced under the hot rolling conditions shown in Table 2. In this regard, the $Ar_3$ transformation point shown in Table 1 was determined by the above-described method.

The volume fraction of the bainite microstructure, the average grain size of the bainitic ferrite, the proportion of carbides precipitated at grain boundaries, and the proportion of carbides having particle grain sizes of 20 to 300 nm were determined by the methods described below.

A test piece for a scanning electron microscope (SEM) was taken, a sheet thickness cross-section parallel to the rolling direction was polished and, thereafter, nital etching was performed. The total sheet thickness was divided into ten equal parts, and a SEM photograph of central portion of each part was taken at the magnification of 1,500 times. The secondary phases, e.g., a polygonal ferrite phase and pearlite, were extracted by image processing, and an area fraction was measured by subtracting these phases from the total on the basis of image analysis processing. The average value of these ten fields of view was specified to be the volume fraction of the bainite microstructure in embodiments. Also, the average grain size of bainitic ferrite constituting the bainite microstructure was measured in conformity with a linear analysis method.

Meanwhile, as for carbides, SEM photographs of the same ten fields of view as those described above were taken at the magnification of 10,000 times, and each of the proportion of carbides dispersed at grain boundaries and the proportion of carbides which had an average particle grain size of 20 to 300 nm and which were dispersed at grain boundaries was measured.

The proportion of carbides dispersed at grain boundaries was determined on the basis of (the number of carbides present at grain boundaries)/(the number of total carbides), where the number of carbides present at grain boundaries and the number of total carbides in the SEM photographs of the same ten fields of view as those described above were counted. In this regard, as for the carbides present at grain boundaries, in the case where at least part of carbide was in contact with a grain boundary, the carbide concerned was specified to be the carbide present at the grain boundary. Also, the proportion of carbides having grain sizes of 20 to 300 nm was determined on the basis of (the number of carbides having grain sizes of 20 to 300 nm)/(the number of total carbides), where the grain sizes of the individual carbides were measured in the SEM photographs of the same ten fields of view as those described above.

TABLE 1

| Steel slab | Chemical composition (percent by mass) | | | | | | | | | $Ar_3$ transformation | |
|---|---|---|---|---|---|---|---|---|---|---|---|
| No. | C | Si | Mn | P | S | N | Al | Ti | Others | point (° C.) | Remarks |
| A | 0.072 | 0.51 | 1.69 | 0.041 | 0.0011 | 0.0033 | 0.022 | 0.059 | | 860 | within scope of embodiments |
| B | 0.079 | 0.15 | 1.47 | 0.025 | 0.0039 | 0.0011 | 0.012 | 0.089 | Nb: 0.008, V: 0.014 | 850 | within scope of embodiments |
| C | 0.081 | 0.84 | 1.27 | 0.021 | 0.0024 | 0.0025 | 0.041 | 0.107 | Cr: 0.021, Cu: 0.020, Ni: 0.030 | 888 | within scope of embodiments |
| D | 0.089 | 0.67 | 1.41 | 0.014 | 0.0007 | 0.0031 | 0.035 | 0.113 | Cr: 0.005, REM: 0.0017 | 872 | within scope of embodiments |
| E | 0.099 | 0.98 | 1.08 | 0.018 | 0.0017 | 0.0047 | 0.059 | 0.125 | Ca: 0.0010 | 900 | within scope of embodiments |

TABLE 1-continued

| Steel slab No. | Chemical composition (percent by mass) C | Si | Mn | P | S | N | Al | Ti | Others | Ar3 transformation point (° C.) | Remarks |
|---|---|---|---|---|---|---|---|---|---|---|---|
| F | 0.116 | 0.34 | 1.79 | 0.008 | 0.0009 | 0.0066 | 0.071 | 0.146 | Mo: 0.012 | 847 | within scope of embodiments |
| G | 0.059 | 0.28 | 1.21 | 0.036 | 0.0031 | 0.0041 | 0.029 | 0.063 | Nb: 0.028 | 867 | out of scope of embodiments |
| H | 0.144 | 0.07 | 1.97 | 0.021 | 0.0047 | 0.0039 | 0.044 | 0.021 | | 807 | out of scope of embodiments |
| I | 0.137 | 0.17 | 1.77 | 0.034 | 0.0026 | 0.0079 | 0.022 | 0.179 | Cu: 0.040, Ni: 0.080 | 863 | out of scope of embodiments |

TABLE 2

| Hot rolled steel sheet No. | Steel slab No. | Sheet thickness (mm) | Heating temperature (° C.) | Finish rolling temperature (° C.) | Rolling reduction of final stand (%) | Average cooling rate (° C./s) | Coiling temperature (° C.) |
|---|---|---|---|---|---|---|---|
| 1 | A | 3.6 | 1245 | 907 | 23 | 45 | 525 |
| 2 | A | 3.6 | 1190 | 885 | 25 | 55 | 430 |
| 3 | A | 3.6 | 1165 | 865 | 22 | 50 | 295 |
| 4 | B | 4.0 | 1260 | 865 | 26 | 45 | 405 |
| 5 | C | 4.5 | 1275 | 915 | 38 | 40 | 430 |
| 6 | C | 5.5 | 1285 | 955 | 12 | 20 | 475 |
| 7 | C | 4.5 | 1295 | 985 | 21 | 40 | 390 |
| 8 | D | 6.0 | 1270 | 910 | 29 | 35 | 415 |
| 9 | E | 3.2 | 1255 | 935 | 20 | 65 | 425 |
| 10 | F | 2.6 | 1285 | 865 | 44 | 80 | 395 |
| 11 | G | 4.5 | 1300 | 895 | 20 | 40 | 505 |
| 12 | H | 2.6 | 1265 | 835 | 21 | 40 | 380 |
| 13 | I | 3.2 | 1240 | 875 | 25 | 40 | 405 |
| 14 | A | 3.6 | 1190 | 885 | 13 | 55 | 430 |
| 15 | A | 3.6 | 1190 | 885 | 25 | 20 | 430 |

The mechanical properties were determined by the following method, where JIS No. 5 tensile test pieces (direction at a right angle to the rolling direction) were taken. Two tensile test pieces were subjected to a tensile test at a strain rate of 10 mm/min in conformity with JIS Z 2241 to determine the yield strength (YS) and the tensile strength (TS). The tensile strength of 780 MPa or more was specified to be acceptable.

As for the magnetic properties, the magnetic flux density B50 was determined by Epstein testing and 1.48 or more was specified to be acceptable.

As for the punchability, the end surface quality described below was evaluated and, thereby, acceptance was judged. Punching of 10 mmϕ was performed at a clearance of 15% and SEM photographs of punched surfaces in the rolling direction (L direction) and in the direction orthogonal to the rolling direction (C direction) were taken. The proportion of a normal portion remaining after removal of irregular portions, e.g., a cracked portion, a brittle fracture appearance, and a secondary shear section, from a whole end surface fracture portion was measured and the resulting proportion of normal portion of 95% or more was specified to be acceptable.

The results are shown in Table 3.

TABLE 3

| Hot rolled steel sheet No. | Volume fraction of bainite microstructure (%) | Bainitic ferrite average grain size (μm) | Proportion of grain boundary precipitation carbides (%) | Proportion of 20 to 300 nm carbides (%) | YS (MPa) | TS (MPa) | B50 (T) | Proportion of punched surface normal portion (%) | Remarks |
|---|---|---|---|---|---|---|---|---|---|
| 1 | 44 | 3.3 | 89 | 41 | 578 | 713 | 1.21 | 56 | comparative example |
| 2 | 95 | 2.7 | 87 | 88 | 709 | 789 | 1.71 | 95 | example |
| 3 | 28 | 2.2 | 28 | 33 | 756 | 844 | 1.16 | 69 | comparative example |
| 4 | 98 | 2.8 | 81 | 83 | 741 | 841 | 1.69 | 96 | example |
| 5 | 98 | 3.1 | 93 | 91 | 736 | 825 | 1.74 | 99 | example |
| 6 | 56 | 6.2 | 81 | 56 | 601 | 745 | 1.28 | 75 | comparative example |
| 7 | 95 | 6.3 | 49 | 65 | 755 | 865 | 1.42 | 65 | comparative example |
| 8 | 99 | 1.9 | 96 | 93 | 747 | 835 | 1.82 | 100 | example |
| 9 | 96 | 3.7 | 84 | 81 | 712 | 798 | 1.63 | 95 | example |
| 10 | 100 | 1.6 | 81 | 83 | 909 | 991 | 1.66 | 100 | example |

TABLE 3-continued

| Hot rolled steel sheet No. | Volume fraction of bainite microstructure (%) | Bainitic ferrite average grain size (μm) | Proportion of grain boundary precipitation carbides (%) | Proportion of 20 to 300 nm carbides (%) | YS (MPa) | TS (MPa) | B50 (T) | Proportion of punched surface normal portion (%) | Remarks |
|---|---|---|---|---|---|---|---|---|---|
| 11 | 17 | 4.2 | 66 | 46 | 578 | 727 | 1.28 | 44 | comparative example |
| 12 | 66 | 2.3 | 48 | 39 | 883 | 1014 | 1.11 | 75 | comparative example |
| 13 | 83 | 2.1 | 39 | 61 | 996 | 1211 | 1.19 | 81 | comparative example |
| 14 | 95 | 6.5 | 70 | 88 | 709 | 789 | 1.71 | 75 | comparative example |
| 15 | 75 | 4.5 | 80 | 78 | 651 | 710 | 1.31 | 89 | comparative example |

Every example according to disclosed embodiments exhibits good tensile strength, magnetic properties, and punchability.

The invention claimed is:

1. A high strength hot rolled steel sheet having a bainite microstructure and a tensile strength of 780 MPa or more, the steel sheet having a chemical composition comprising:

C: 0.070% to 0.140%, by mass %;
Si: 0.10% to 1.00%, by mass %;
Mn: 1.00% to 1.80%, by mass %;
P: 0.050% or less, by mass %;
S: 0.0050% or less, by mass %;
N: 0.0080% or less, by mass %;
Al: 0.010% to 0.100%, by mass %;
Ti: 0.050% to 0.150%, by mass %; and
a balance of Fe and incidental impurities,
wherein the bainite microstructure is 96% or more on a volume fraction basis,
carbides constituting 80% or more of total precipitation carbides are dispersed at grain boundaries of bainitic ferrite constituting the bainite microstructure,
80% or more of total precipitation carbides have particle grain sizes in the range of 20 to 300 nm, and
the bainite microstructure is upper bainite.

2. The high strength hot rolled steel sheet according to claim 1, wherein the average grain size of the bainitic ferrite is in the range of 1.5 to 5.0 μm.

3. The high strength hot rolled steel sheet according to claim 1, further comprising at least one selected from the group consisting of V: 0.005% to 0.100%, by mass %, Nb: 0.005% to 0.100%, by mass %, Cu: 0.005% to 0.100%, by mass %, Ni: 0.005% to 0.100%, by mass %, Cr: 0.002% to 0.100%, by mass %, Mo: 0.002% to 0.100%, by mass %, Ca: 0.0005% to 0.0050%, by mass %, and REM: 0.0005% to 0.0300%, by mass %.

4. The high strength hot rolled steel sheet according to claim 3, wherein the average grain size of the bainitic ferrite is in the range of 1.5 to 5.0 μm.

5. The high strength hot rolled steel sheet according to claim 1, wherein a magnetic flux density B50 of the steel sheet as determined by Epstein testing is in the range of 1.48 or more.

6. The high strength hot rolled steel sheet according to claim 1, wherein a yield strength of the steel sheet is in the range of 709 MPa or more.

7. The high strength hot rolled steel sheet according to claim 1, wherein the bainite microstructure is in a range of 96% or more and 99% or less on the volume fraction basis.

* * * * *